(12) United States Patent
Sakane

(10) Patent No.: US 8,390,900 B2
(45) Date of Patent: Mar. 5, 2013

(54) IMAGE READING DEVICE, IMAGE READING DEVICE SHADING CORRECTION METHOD, AND IMAGE FORMING APPARATUS

(75) Inventor: Hiroki Sakane, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 483 days.

(21) Appl. No.: 12/792,879

(22) Filed: Jun. 3, 2010

(65) Prior Publication Data

US 2010/0315687 A1    Dec. 16, 2010

(30) Foreign Application Priority Data

Jun. 12, 2009   (JP) ................. 2009-141432

(51) Int. Cl.
*H04N 1/40*   (2006.01)
(52) U.S. Cl. ........................ 358/461; 358/462
(58) Field of Classification Search .............. None
See application file for complete search history.

(56) References Cited

U.S. PATENT DOCUMENTS

2002/0051157 A1* 5/2002 Ishikawa .............. 358/1.9
2006/0221358 A1* 10/2006 Takahashi ............. 358/1.1

FOREIGN PATENT DOCUMENTS

| JP | 1-147780 | 6/1989 |
|----|----------|--------|
| JP | 3-79161 | 4/1991 |
| JP | 3-268566 | 11/1991 |
| JP | 5-219369 | 8/1993 |
| JP | 5-233799 | 9/1993 |
| JP | 6-85567 | 12/1994 |
| JP | 9-200456 | 7/1997 |
| JP | 2003-219117 | 7/2003 |

OTHER PUBLICATIONS

Japanese Office Action mailed on May 22, 2012 for Application No. 2009-141432.

* cited by examiner

*Primary Examiner* — Douglas Tran
(74) *Attorney, Agent, or Firm* — Smith, Gambrell & Russell, LLP

(57) ABSTRACT

An image reading device includes: a light source irradiating a reading target with light; an image sensor receiving incoming reflection light from the reading target and reading the reading target; a plurality of kinds of white reference plates of mutually different brightness levels provided for acquiring a white reference in shading correction; an input part accepting input of selection, as a mode for document reading, between a character mode prioritizing character reproduction and a photo mode prioritizing figure and photo reproduction; and a shading correction part, when the character mode has been selected, perform the shading correction by defining the white reference based on output of the image sensor when the character-mode white reference plate darker than the photo-mode white reference plate has been read.

15 Claims, 11 Drawing Sheets

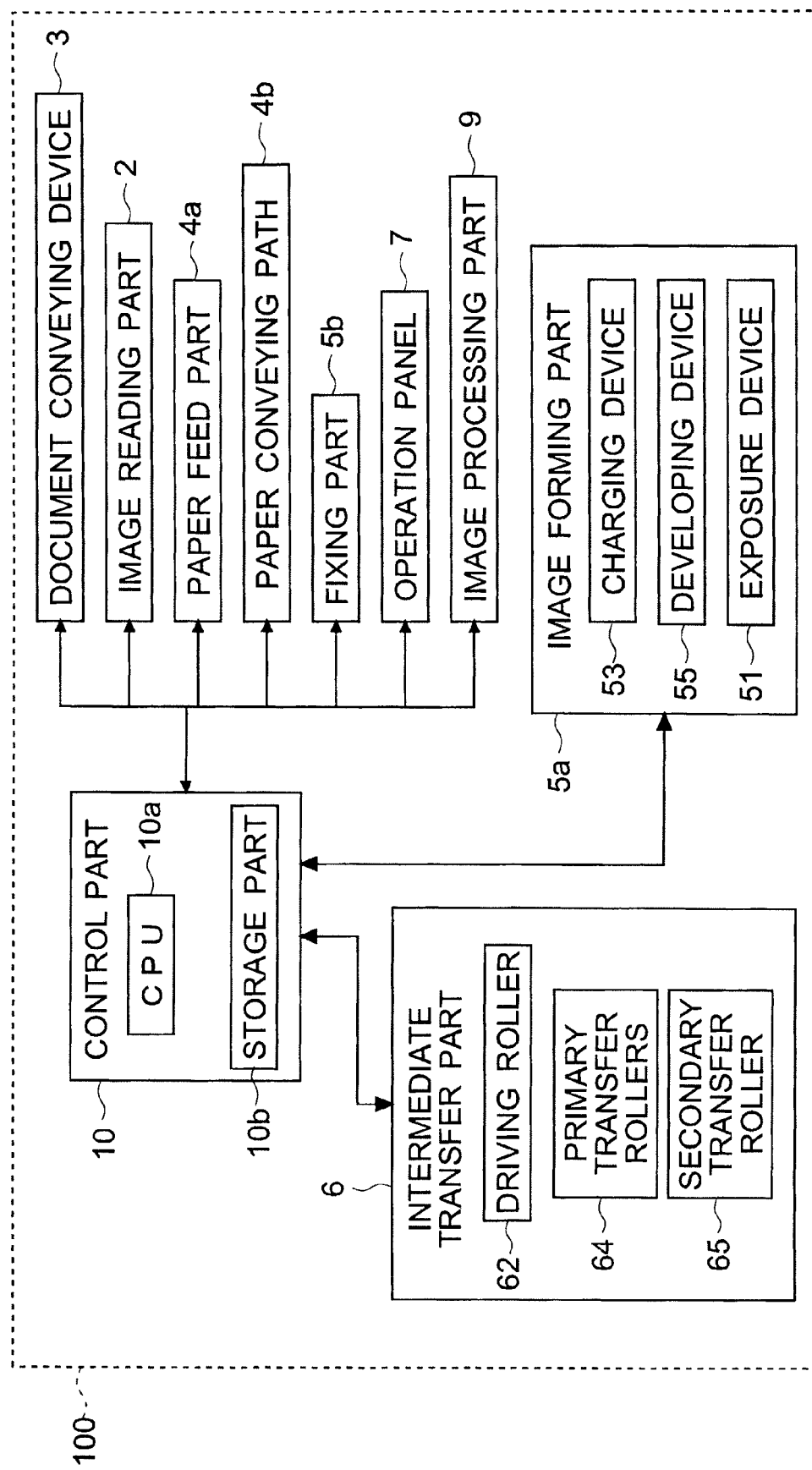

IMAGE READING DEVICE, IMAGE READING DEVICE SHADING CORRECTION METHOD, AND IMAGE FORMING APPARATUS

This application is based upon and claims the benefit of priority from the corresponding Japanese Patent Application No. 2009-141432 filed on Jun. 12, 2009, the entire contents of which are incorporated herein by reference.

BACKGROUND OF THE INVENTION

1. Field of the Invention

The present invention relates to an image reading device which is provided in an image forming apparatus such as a multi-function printer (MFP) or a copier and which performs shading correction on image data obtained by document reading. The present invention also relates to an image reading device shading correction method.

2. Description of Related Art

An image reading device such as a scanner reads a document to generate image data. Moreover, the image reading device may be provided in an image forming apparatus such as a copier, a multi-function printer (MFP), a fax machine, or the like. The image reading device has distortion occurring depending on a pixel position due to a variation between light receiving elements in an image sensor (for example, CCD), a difference in the degree of condensation between a lens center and a peripheral part, uneven light amount distribution of a light source, etc. Thus, in the image reading device, image processing of shading correction for performing, for example, normalization between a white reference and a black reference to correct the distortion depending on the pixel position may be performed on each of pixels.

In order to acquire the white reference ("sparkling white") in the shading correction, a white reference plate may be provided in the image reading device. Then a white reference of each pixel is defined based on output data provided from the image sensor when the white reference plate has been read. Note that in order to indicate "jet black", a black reference plate may be provided in the image reading device.

Here, for example, when a character-dominant document has been read, in order to sharpen characters to obtain an image with a clear white-black difference, image processing such as Y conversion processing, spatial filter processing (for example, edge enhancement processing), and/or the like may be performed on image data already subjected to the shading correction.

Known as one example of an image processor performing such image processing is an image processor which handles image density as image data quantized in multi-gradations for each pixel, which has a Y converter for the image data and a smoother for the image data, and which controls Y conversion properties of the Y converter in accordance with a result of smoothing by the smoother. With this configuration, an attempt is made to obtain a reproduced image with less background disturbance and a clear black-white difference.

Typically, gradations of each pixel of the image data in reading by the image reading device are regulated between a white reference and a black reference. Then the white reference is acquired by reading a white reference plate. In other words, the image reading device cannot read (acquire) white whiter than the white reference plate.

Then in the image reading device, not only a written document but also various other types of documents such as photos are read, and thus it is preferable that a density range in reading be as wide as possible. Therefore, to the image reading device, a whitest possible white reference plate is fitted. Moreover, used as the black reference is, for example, output data of an image sensor in a state in which a reading lamp is turned off.

However, in a case where a character-dominant document is read by a copier or the like, if black as the black reference is darker (blacker) than black of a character portion, characters are read in gray a little brighter than jet black. Similarly, if the white reference plate is brighter (whiter) than background and a blank space of white paper, the background, etc. are read in gray a little darker than sparkling white.

Here, in the image forming apparatus or the image reading device, in a case where a character mode that prioritizes character reproducibility has been selected, in order to obtain an image with a clear black-white difference, image processing of replacing a density value of the pixels at the character portion to be blacker and replacing a density value of the pixels at the background portion to be whiter may be performed. Specifically, the γ conversion processing and/or spatial filter processing as described above may be performed on the image data. Moreover, for example, image processing of replacing a density value to be sparkling white or jet black with density between the white reference and the black reference serving as a border may be performed on each pixel.

However, the image processing such as the Y conversion processing and/or the spatial processing is performed on the entire image data. Thus, the image processing such as the Y conversion processing and/or the spatial processing causes a problem of image quality deterioration, such as lack of information of a pixel portion in gradations between the white reference and the black reference, such as pictures, figures, color gradation, a photo portion, etc. other than characters in the image data. In other words, as long as some image processing is performed, the image data is modified, whereby the image quality deterioration possibly occurs in terms of document reproducibility, etc.

For conventional image reading devices, MTF correction (edge enhancement), γ conversion, and/or the like is performed on image data already subjected to shading correction. Therefore, there possibly arises a problem of image quality deterioration attributable to the image processing such as the γ conversion, which fails to solve the problem described above.

SUMMARY OF THE INVENTION

In view of the problem associated with the related arts described above, it is an object of the present invention to achieve higher image quality of a read image by providing an image reading device with a plurality of kinds of reference plates for reference acquisition in shading correction, switching the reference plate to be used in accordance with a document reading mode, and using only a density range required for each document.

To achieve the object described above, An image reading device according to one aspect of the present invention includes: a light source irradiating a reading target with light; an image sensor receiving incoming reflection light from the reading target and reading the reading target; a plurality of kinds of white reference plates of mutually different brightness levels provided for acquiring a white reference in shading correction; an input part accepting input of selection, as a mode for document reading, between a character mode prioritizing character reproduction and a photo mode prioritizing figure and photo reproduction; and a shading correction part, when the character mode has been selected, perform the shading correction by defining the white reference based on output of the image sensor when the character-mode white reference plate darker than the photo-mode white reference plate has been read.

Consequently, in the character mode, the white reference is defined by reading the character-mode white reference plate darker than the photo-mode white reference plate. In other words, in the character mode, a density range (entire density region) in document reading is intentionally narrowed down. Thus, a portion whiter (brighter) than the character-mode white reference plate is read in sparkling white. Therefore, a background portion and a blank space of paper are easily read in sparkling white.

Further features and advantages of the present invention will be further clarified by embodiments described below.

BRIEF DESCRIPTION OF THE DRAWINGS

FIG. 4 is a block diagram showing one example of hardware configuration of the copier according to the first embodiment;

DETAILED DESCRIPTION OF PREFERRED EMBODIMENTS

Hereinafter, a first embodiment of the present invention will be described with reference to FIGS. 1 to 8. Note that factors such as configuration and arrangement described in each of embodiments do not limit the scope of the present invention and thus just serve as illustrative examples.

(Outline of a Copier 100)

Figure 1:
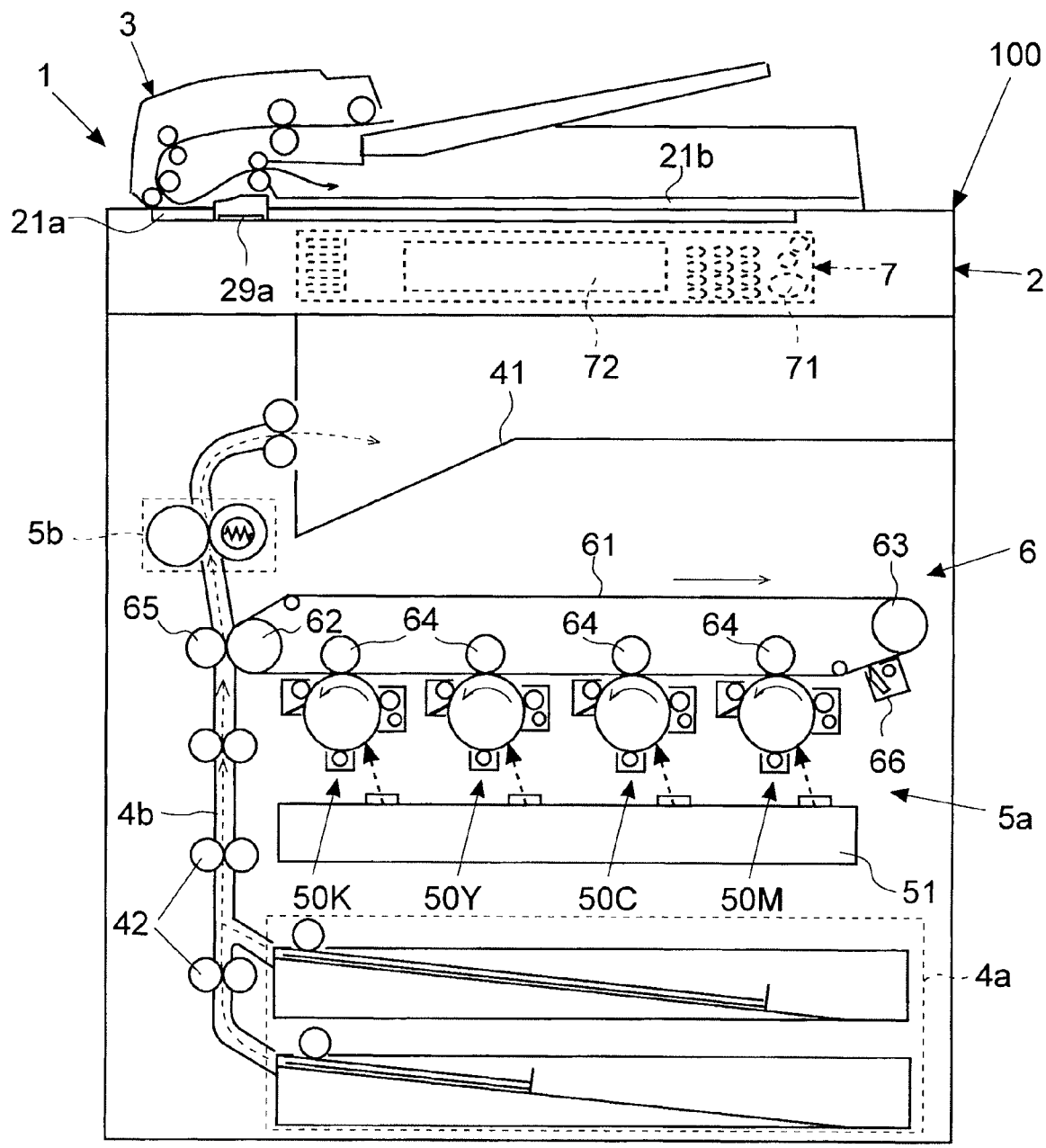
FIG. 1 is a schematic elevation sectional view of a copier according to a first embodiment of the present invention.

First, referring to FIG. 1, outline of a copier 100 (corresponding to an image forming apparatus) according to the first embodiment of the present invention will be described. FIG. 1 is a schematic elevation sectional view of the copier 100 according to the first embodiment of the present invention.

As shown in FIG. 1, arranged on the top of the copier 100 is an image reading device 1 composed of an image reading part 2 (to be described in detail later) that reads an image of a document; and a document conveying device 3 (to be described in detail later). Arranged inside the copier 100 are: a paper feed part 4a, a paper conveying path 4b, an image forming part 5a (to be described in detail later), an intermediate transfer part 6, a fixing part 5b, etc.

At the front of the copier 100 in an elevation view, an operation panel 7 (corresponding to an input part) can be provided which has: a start key 71 for giving instructions for starting operation of the image reading device 1 and the copier 100; and a liquid crystal display part 72 of a touch-screen type (shown by broken lines in FIG. 1). For example, the liquid crystal display part 72 accepts setting instructions by menu selection through the touch panel. Moreover, the liquid crystal display part 72 performs for a user information-transmitting display such as a status of the copier 100.

Moreover, the copier 100 of this embodiment, in document reading or copying, can selectively input through the liquid crystal display part 72 a character mode that is character-oriented and a photo mode that is figure- or photo-oriented. For example, the user can make selection between the character mode and the photo mode by pressing various keys displayed on the liquid crystal display part 72. That is, the operation panel 7 accepts the input of the selection between the character mode that prioritizes character reproduction and the photo mode that prioritizes photo or figure reproduction.

Note that the keys for the selection between the character mode and the photo may not be displayed on the operation panel 7 but may be provided as hard keys. In other words, a character mode selection key and a photo mode selection key may be arranged on the operation panel 7 as specific keys.

The paper feed part 4a stores as a recording medium paper (of different sizes including A4, B4, etc.) or the like and supplies the paper upon image formation. The paper conveying path 4b conveys the supplied paper to a discharge tray 41. To this end, a conveying member such as conveying roller pairs 42 or the like is plurally provided on the paper conveying path 4b.

The intermediate transfer part 6 is a portion which is provided above the image forming part 5a and which accepts, based on image data, primary transfer of toner images respectively formed on peripheral surfaces of photoconductor drums 52 of the image forming part 5a and performs secondary transfer of the toner images onto the paper. An intermediate transfer belt 61 is stretched over a driving roller 62, a driven roller 63, four primary transfer rollers 64, etc. in such a manner that a lower outer peripheral surface of the intermediate transfer belt 61 abuts against each of the photoconductor drums 52. The driving roller 62 is connected with driving means (not shown) such as a motor, a gear, or the like to be thereby rotated.

The intermediate transfer belt 61 is rotated clockwise (in a direction of arrow) in FIG. 1 by the rotation of the driving roller 62. Here, the primary transfer rollers 64 are rotatably arranged in such a manner as to oppose in one-to-one correspondence with the photoconductor drums 52, and a predetermined volume of voltage is applied to the primary transfer rollers 64. The toner images of different colors are respectively primarily transferred from the photoconductor drums 52 onto the intermediate transfer belt 61 by the voltage application. The toner images of the different colors are superimposed on each other without any displacement upon this primary transfer.

A secondary transfer roller 65 that abuts against the intermediate transfer belt 61, opposes the driving roller 62, and is rotatably supported is provided in the intermediate transfer part 6. When the paper and the toner images enter into a nip between the driving roller 62 and the intermediate transfer belt 61, a predetermined voltage is applied to the secondary transfer roller 65, whereby the toner images are secondarily transferred onto the paper. A belt cleaner 66 performs cleaning by removing remaining toner, etc. from the intermediate transfer belt 61. The fixing part 5*b* fixes the toner images transferred onto the paper. The paper is pressurized and heated upon passage through the fixing part 5*b*, whereby the toner images are fixed onto the paper. Then the paper is discharged to the discharge tray 41, thereby completing the image formation.

(Configuration of the Image Forming Part 5*a*)

Figure 2:
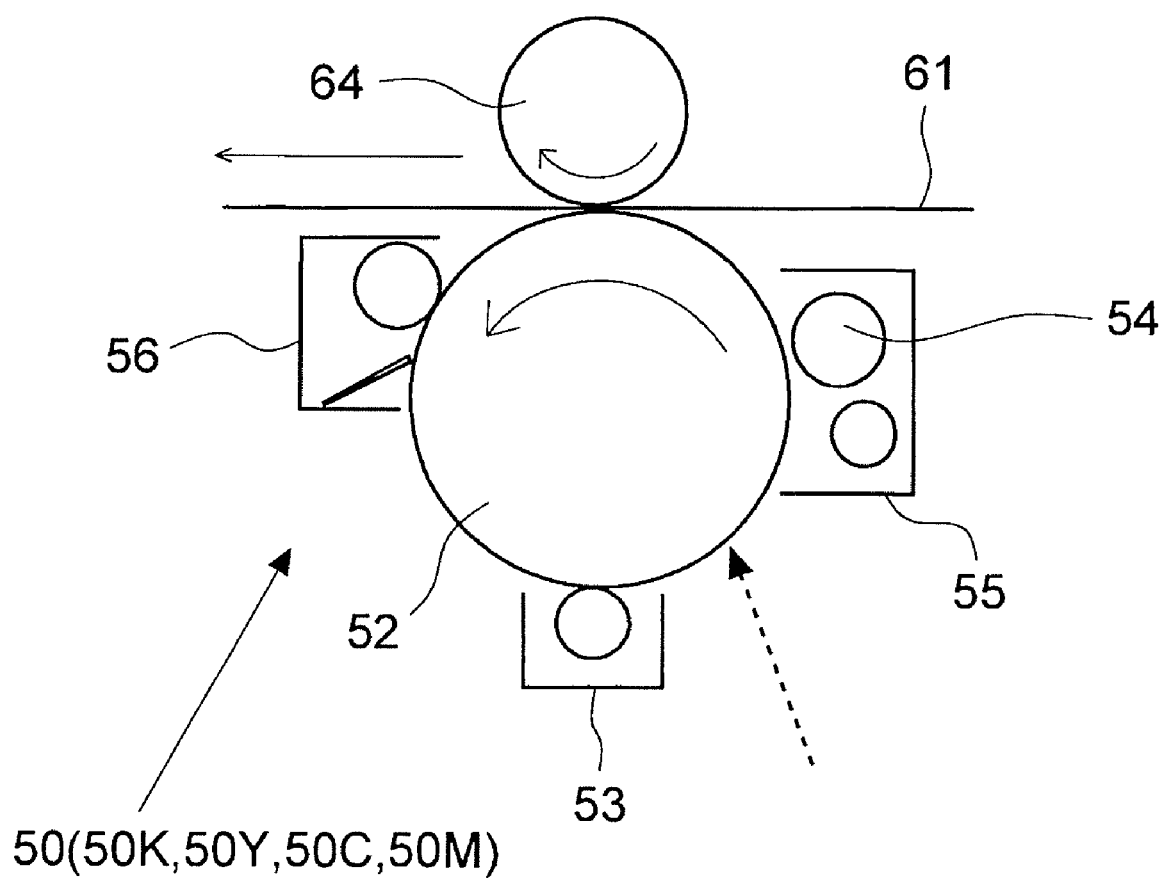
FIG. 2 is a partially enlarged schematic sectional view of an image forming part according to the first embodiment of the present invention.

Next, based on FIGS. 1 and 2, the image forming part 5*a* of the copier 100 according to the first embodiment of the present invention will be described. FIG. 2 is a partially enlarged schematic sectional view of the image forming part 5*a* according to the first embodiment of the present invention.

The image forming part 5*a* forms images (the toner images) for the purpose of performing printing on the recording medium based on the image data. The image forming part 5*a*, as shown in FIG. 1, includes: four image forming units 50K (for forming the black toner image), 50C (for forming the cyan toner image), 50M (for forming the magenta toner image), and 50Y (for forming the yellow toner image), and an exposure device 51 that performs optical scanning and exposure on each of the photoconductor drums 52 based on the image data to thereby form an electrostatic latent image.

In this manner, the copier 100 of this embodiment can form a color toner image (color image) by using toners of a plurality of colors including black. Note that the image forming units 50 use the mutually different toner colors but have the same basic configuration, and thus symbols K, Y, C, and M will be omitted in the description below unless specifically described.

As shown in FIG. 2, each of the image forming units 50 includes the photoconductor drum 52 which is so supported as to be rotatable in a direction of arrow shown in the same figure, and which is driven by a motor (not shown) or the like into rotation in a predetermined direction. Moreover, arranged around the photoconductor drum 52 are: a charging device 53, a developing device 55, and a cleaner 56.

The charging device 53 uniformly charges a surface of the photoconductor drum 52 to a predetermined potential. The exposure device 51 subjects the charged surface of the photoconductor drum 52 to scanning and light exposure in accordance with the image data. The developing device 55 includes a developing roller 54 which carries a toner and to which developing bias is applied for the purpose of moving the toner to the photoconductor drum 52. The developing device 55 supplies the charged toner to the electrostatic latent image for development (image visualization). The cleaner 56 cleans the surface of the photoconductor drum 52. With this configuration, the toner image is formed on the peripheral surface of each of the photoconductor drums 52 and the toner image is primarily transferred to the intermediate transfer part 6.

(Configuration of the Image Reading Device 1)

Figure 3A:
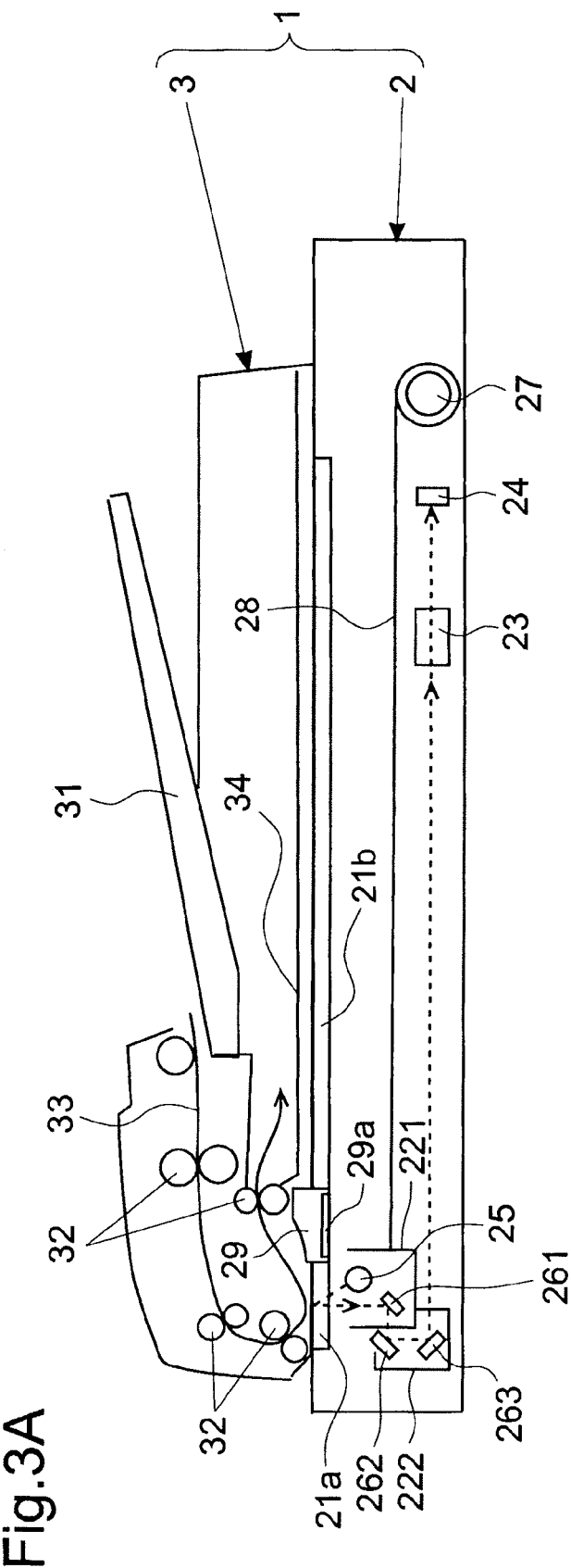
FIG. 3A is a schematic elevation sectional view showing one example of an image reading device according to the first embodiment and FIG. 3B is a plan view showing one example of a shading plate.
Figure 3B:
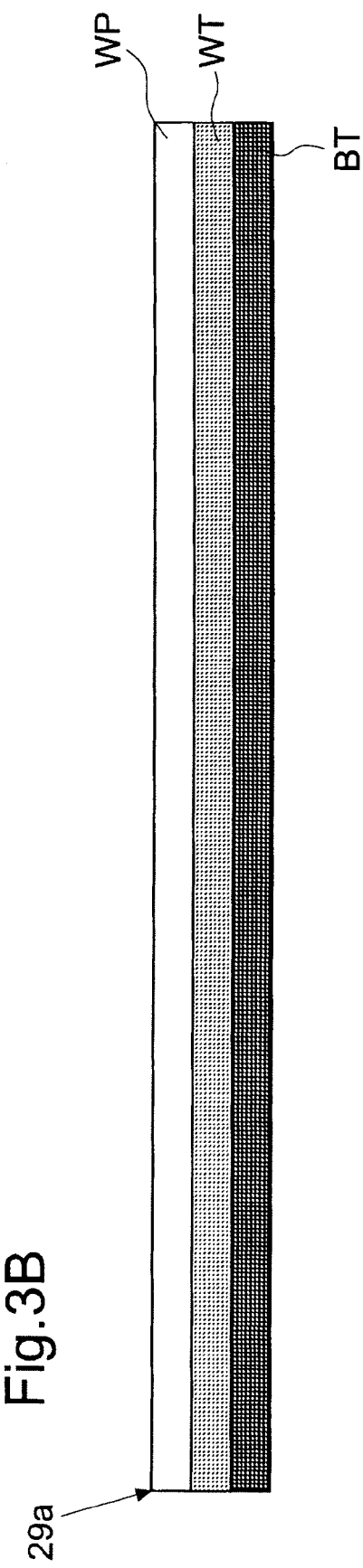

Next, based on FIGS. 3A and 3B, the image reading device 1 according to the first embodiment of the present invention will be described. FIG. 3A is a schematic elevation sectional view showing one example of the image reading device 1 according to the first embodiment of the present invention, and FIG. 3B is a plan view showing one example of a shading plate 29*a*.

The image reading device 1 of this embodiment includes the image reading part 2 and the document conveying device 3. First, the document conveying device 3 is provided with: a document tray 31 on which documents to be read are loaded; a plurality of document conveying roller pairs 32 that performs document conveyance; a document conveying path 33, and a document discharge tray 34. Documents on the document tray 31 are individually delivered to the document conveying path 33. The delivered documents are automatically and continuously conveyed in such a manner as to make contact with a document-delivered reading contact glass 21*a* on a top surface of the image reading part 2. In addition, the document conveying device 3, by a support point (not shown) provided on a rear side of a paper surface, can be lifted upward, and documents, for example, a book or the like, can be loaded on a document-loaded reading contact glass 21*b* on the top surface of the image reading part 2.

Next, the image reading part 2 is unitized as a scanner, which irradiates the document with light and reads the document based on reflection light thereof to generate image data. To this end, the image reading part 2 is provided with: a first moving frame 221, a second moving frame 222, a lens 23, an image sensor 24, etc.

The first moving frame 221 extends in a main scanning direction (direction perpendicular to the paper surface of FIG. 3A), and is provided with: a lamp 25 (corresponding to a light source) that irradiates a reading target with light; and a first mirror 261. The second moving frame 222 is provided with a second mirror 262 and a third mirror 263. The lens 23 focuses the reflection light of the document. The image sensor 24 (for example, CCD) includes a plurality of light receiving elements arranged in a plurality of lines. As a result of receiving the incoming reflection light focused by the lens 23 after hitting the document from the lamp 25, the image sensor 24 performs photoelectric conversion in accordance with an amount of the reflection light. In other words, the image sensor 24 receives the incoming reflection light from the reading target and reads the reading target.

At the time of document reading with the document conveying device 3, each of the moving frames is secured below the document-delivered reading contact glass 21*a* (a state shown in FIG. 3A). On the other hand, at the time of reading the document on the document-loaded reading contact glass 21*b*, each of the moving frames is moved horizontally by rotational driving of a wind-up drum 27, whereby reading is performed. Each of the moving frames and the wind-up drum 27 are connected together with a wire 28. The wind-up drum 27 is rotated by a wind-up motor 27M that makes forward and reverse rotation (see FIG. 5). Consequently, each of the moving frames moves. Details of the image data generation will be described later.

Here, a guide member 29 that guides the document conveyance is provided between the document-delivered reading contact glass 21*a* and the document-loaded reading contact glass 21*b*. A shading plate 29*a* for acquiring a white reference and a black reference upon shading correction is provided on a bottom surface of the guide member 29. The shading plate 29*a* is a plate extending in the main scanning direction of the image reading device 1 (direction perpendicular to a document conveyance direction and the direction perpendicular to the paper surface of FIG. 3A). The white reference and the black reference in the shading correction are defined by reading this shading plate 29*a*.

Next, based on FIG. 3B, configuration of the shading plate 29*a* will be described. As shown in FIG. 3B, the shading plate 29*a* extends in the main scanning direction of the image reading device 1, and is formed by combining elongated reference plates of mutually different colors. Specifically, provided are: from the top of FIG. 3B, a photo-mode white reference plate WP, a character-mode white reference plate WT, and a character-mode black reference plate BT. That is, in the copier 100 of this embodiment, at least one black reference plate is provided for the purpose of black reference acquisition in the shading correction. In this embodiment, a black reference in the photo mode is defined based on output of the image sensor 24 in a state in which the lamp 25 is off.

Here, the character-mode white reference plate WT is darker than the photo-mode white reference plate WP (for example, light gray and for example, darker than a color of the paper). That is, for the purpose of white reference acquisition in the shading correction, a plurality of kinds of white reference plates of mutually different brightness levels are provided. Moreover, output data (for example, a voltage value or a current value) of the image sensor 24 indicates a brighter value when the character-mode black reference plate BT (for example, dark gray and for example, brighter than a character printed with maximum density) is read than when reading is performed in the state in which the lamp 25 is off.

(Hardware Configuration in Control of the Copier 100)

Next, based on FIG. 4, hardware configuration of the copier 100 according to the first embodiment of the present invention will be described. FIG. 4 is a block diagram showing one example of the hardware configuration of the copier 100 according to the first embodiment of the present invention.

As shown in FIG. 4, the copier 100 according to this embodiment has a control part 10 therein. The control part 10 is in charge of controlling the entire copier 100. For example, the control part 10 includes a CPU 10*a*, a storage part 10*b*, etc. Note that the control part 10 may be provided in a plurality of kinds divided for different functions, including: a main control part that performs overall control; an engine control part that performs image formation, turning ON/OFF of a motor or the like rotating various rotors, etc. and then controls printing; and so on. In this description, these control parts will be described in a collected form.

The CPU 10*a* is a central processing unit, and performs control and arithmetic operation of the various parts of the copier 100 based on a control program stored in the storage part 10*b* for exploration. The storage part 10*b* is composed of storage devices including a ROM, a RAM, an HDD, a flush ROM, etc. The storage part 10*b* stores: a program for controlling the copier 100; control data; setting data; image data obtained by scanning by the image reading part 2; etc.

The control part 10 is connected to: the document conveying device 3 and the image reading part 2 as the image reading device 1; and the paper feed part 4*a*, the paper conveying path 4*b*, the intermediate transfer part 6, the image forming part 5*a*, the fixing part 5*b*, an image processing part 9 (to be described later), the operation panel 7, etc. in the copier 100, and based on the control program and the data in the storage part 10*b*, controls operation of the various parts in a manner such that image formation is performed properly. Moreover, for example, the control part 10 recognizes contents of input to the operation panel 7, such as, for example, the mode selection between the character-mode, the photo-mode, etc.

(Hardware Configuration of the Image Reading Device 1 and Image Data Generation)

Figure 5:
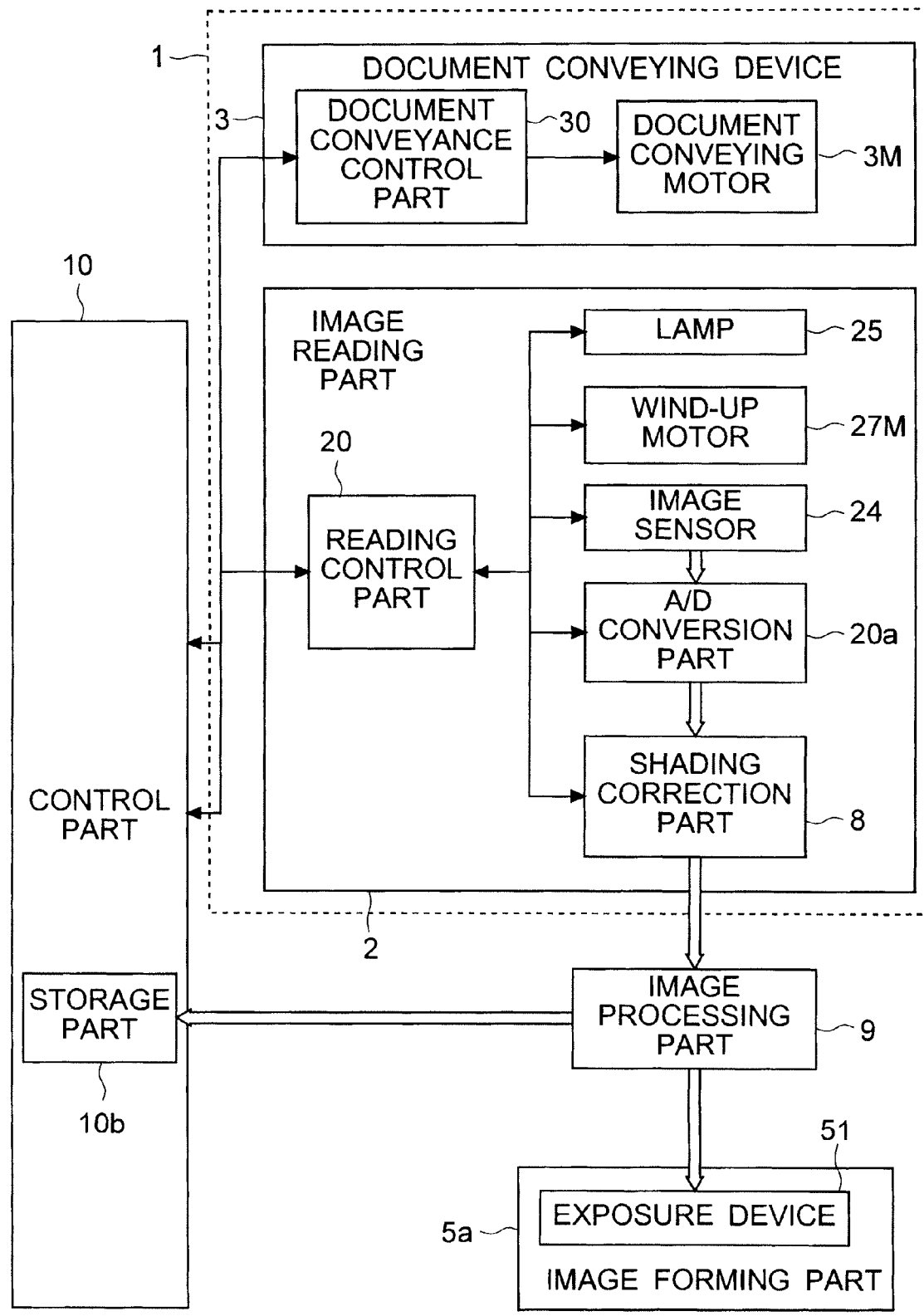
FIG. 5 is a block diagram showing one example of the image reading device according to the first embodiment.

Next, based on FIG. 5, hardware configuration of the image reading device 1 and image data generation according to the first embodiment of the present invention will be described. FIG. 5 is a block diagram showing one example of the image reading device 1 according to the first embodiment of the present invention. Note that a flow of the image data is illustrated by hollow arrows.

First, in the document conveying device 3 as part of the image reading device 1, a document conveyance control part 30 is provided. The document conveyance control part 30 is connected to the control part 10 of a copier 100 main body in such a manner as to be communicatable therewith. The document conveyance control part 30 accepts instructions from the control part 10 of the copier 100 main body in a case where reading of a document placed on the document tray 31 is performed, such as a case where the start key 71 of the operation panel 7 is pressed down. The document conveyance control part 30 controls, for example, a document conveying motor 3M or the like that rotates the various document-conveying rotors, etc. Consequently, operation of the document conveying device 3 is controlled.

Moreover, in the image reading part 2 as part of the image reading device 1, a reading control part 20 is provided. The reading control part 20 is a substrate loaded with various electronic components including a CPU, a memory, a chip, etc. The reading control part 20 is connected to the control part 10 of the copier 100 main body in such a manner as to be communicatable therewith, and accepts instructions from the control part 10 in a case where document reading is performed, such as the case where the start key 71 of the operation panel 7 is pressed down. Moreover, the reading control part 20 is connected to the wind-up motor 27M, the lamp 25, the image sensor 24, etc. The reading control part 20 controls, for example, operation of the wind-up motor 27M that rotates the wind-up drum 27, turning ON/OFF of the lamp 25 that irradiates a document with light, driving of the image sensor 24, etc. Consequently, operation of the image reading part 2 is controlled.

First, in image data generation in the image reading part 2, the image sensor 24 outputs a current (voltage) in accordance with intensity of the reflection light for each pixel. The image sensor 24 of this embodiment is a color line sensor and outputs signals of R, G, and B, respectively. Each output current (voltage) of the image sensor 24 is inputted to an A/D conversion part 20*a*. Note that an amplifier may be provided at a stage in front of the A/D conversion part 20*a*, or the amplifier may be built in the image sensor 24 or the A/D conversion part 20*a*. The A/D conversion part 20*a* converts each analog output current value (voltage value) of each pixel of the image sensor 24 into digital data and outputs it to a shading correction part 8.

The shading correction part 8 acquires, as the white reference and the black reference, the digital data from the A/D conversion part 20*a* based on the output of each pixel of the image sensor 24 when each of the moving frames is moved to a position below the guide member 29 and then the shading plate 29*a* (the character-mode white reference plate WT, the photo-mode white reference plate WP, and the character-mode black reference plate BT) is read before the document reading or in the state in which the lamp 25 is off. That is, the shading correction part 8 performs the shading correction based on output of the image sensor 24 when the white reference plates have been read and based on output of the image sensor 24 when the black reference plate has been read or output of the image sensor 24 when the light source has been turned off.

In the image sensor 24, due to factors such as variation among the light receiving elements respectively corresponding to the pixels arranged in lines (individual property difference), a difference in the degree of condensation between a center part and a peripheral part of the lens 23, variation in an amount of light emission depending on a position of the lamp 25, even when each of the reference plates with the same density or the document is read in the main scanning direction, depending on the pixel position, there arises a difference in value of the current (voltage) outputted by each of the light receiving elements of the image sensor 24 (distortion depending on the pixel position). Thus, the shading correction part 8 defines the white reference and the black reference for each pixel based on the output of the image sensor 24 either in the state in which the lamp 25 is off or when each of the reference plates have been read.

Thereafter, the shading correction part 8 performs for each pixel grading (quantization) between the white reference and the black reference in accordance with a volume of the output of the image sensor 24 (the digital data already subjected to A/D conversion) (for example, grading into eight to ten bits for each of R, G, and B). If the digital data of the image sensor 24 inputted to the shading correction part 8 is not fully stored between the white reference and the black reference, for example, it is treated to be the same value as that of the white reference or the black reference.

For example, when the shading correction part 8 outputs achromatic image data (gray scale), it outputs it with eight bits per pixel (for example, in 256 gradations) and a value of each pixel serves as a density value. For color data, quantization into a total of 24 bits per pixel for RGB is performed (for example, in 256 gradations with Red=8 bits, Green=8 bits, and Blue=8 bits, each taking values of 0 to 255). Note that the shading correction part 8 may always output color image data (of for example, R, G, and B), and the image processing part 9 may perform processing of converting the color image data into achromatic image data.

The white reference and the black reference will be described in detail. In the character-mode, the shading correction part 8 acquires, as the white reference and the black reference in the character-mode, an output value of each of the light receiving elements of the image sensor 24 (the digital data already subjected to A/D conversion) when the character-mode white reference plate WT and the character-mode black reference plate BT have been read.

Moreover, in the photo mode, the shading correction part 8 acquires, as the white reference and the black reference in the photo mode, an output value of each of the light receiving elements of the image sensor 24 (the digital data already subjected to A/D conversion) when the photo-mode white reference plate WP has been read and when the lamp 25 has been turned off.

As a result, for example, in the character mode, for color image data, the shading correction part 8 quantizes, to (R; G; B=0, 0, 0), the output value of the image sensor 24 when the character-mode black reference plate BT has been read, and quantizes, to (R; G; B=255, 255, 255), the output value of the image sensor 24 when the character-mode white reference plate WT has been read. Moreover, for example, in the photo mode, for color image data, the shading correction part 8 quantizes, to (R; G; B=0, 0, 0), the output value of the image sensor 24 when the lamp 25 has been off, and quantizes, to (R; G; B=255, 255, 255), the output value of the image sensor 24 when the photo-mode white reference plate WP has been read. For example, the gray scale may be generated based on a luminance signal of the color image data.

Then the image data of a document image outputted by the shading correction part 8 is inputted to the image processing part 9. The image processing part 9 of this embodiment is a circuit formed by combining a work RAM serving as a processing and working region for the image data, an ASIC as a dedicated circuit, etc. Note that the storage part 10b may store an image processing program and by using the CPU 10a of the control part 10, the image processing part 9 may be realized as software. Moreover, the image processing part 9 may be provided in a substrate of the microcontroller 10.

The image processing part 9 can perform various types of image processing including density conversion processing, zooming processing, image data format conversion processing, etc. However, since feasible image processing is multi-faceted, in this description, assuming that the image processing part 9 can perform well known image processing, a detailed description of the image processing that can be executed by the image processing part 9 will be omitted.

Image data already subjected to the image processing by the image processing part 9 is, for example, transmitted to the exposure device 51 of the image forming part 5a and is used for scanning each of the photoconductor drums 52 and exposing light thereto. Consequently, document-based printing can be performed (copy function). Moreover, for example, the image data already subjected to the image processing by the image processing part 9 can be transmitted to the storage part 10b to be stored therein (scanner function).

(Character Mode)

Figure 6:
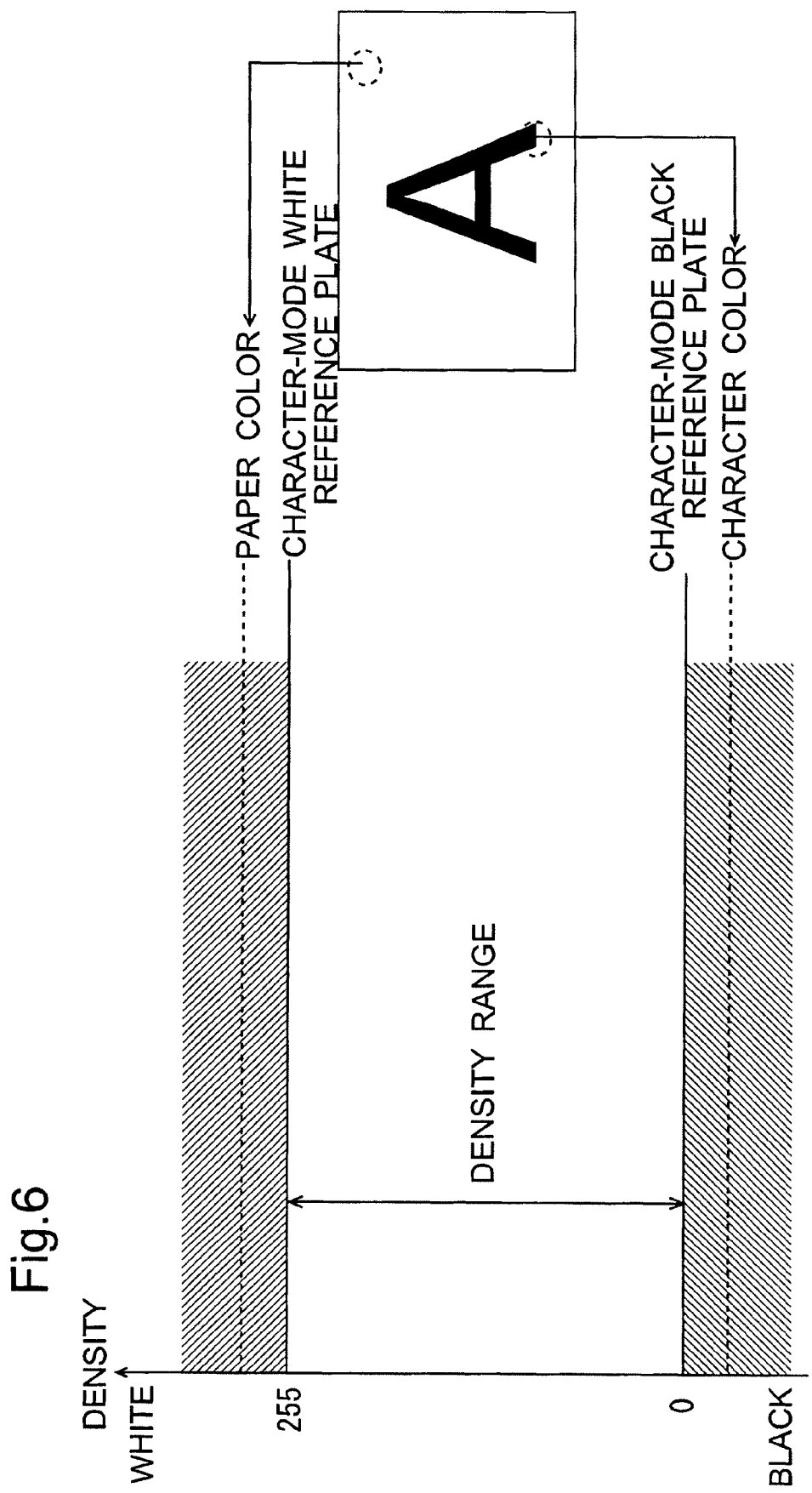
FIG. 6 is an explanatory diagram of one example of shading correction in a character mode according to the first embodiment.

Next, based on FIG. 6, the shading correction in the character mode according to the first embodiment of the present invention will be described. FIG. 6 is an explanatory diagram of one example of the shading correction in the character mode according to the first embodiment of the present invention. A vertical axis of a graph in FIG. 6 denotes density that becomes increasingly whiter (brighter) upward and increasingly blacker (darker) downward.

This description refers to a case where a paper color is white and a character color is black. In addition, the description will be given referring to a case where the character-mode white reference plate WT is darker than the document paper color and the character-mode black reference plate BT is brighter than the character color. Note that, as described above, the user can operate the operation panel 7 to select the character mode.

As described above, the shading correction part 8 of this embodiment, when something whiter than the white reference has been read, expresses it in sparkling white on the image data (for example, with density values of 255:255:255 in the 256 gradations of R:G:B). As shown in FIG. 6, in the case where the paper color is whiter (brighter) than the character-mode white reference plate WT, the pixels at the paper color portion are read in sparkling white.

On the other hand, the shading correction part 8 of this embodiment, when something blacker than the black reference has been read, expresses it in jet black on the image data (for example, with density values of 0:0:0 in the 256 gradations of R, G, and B). As shown in FIG. 6, in the case where the character color is blacker (darker) than the character-mode black reference plate BT, the pixels at the character color portion are read in jet black.

Typically, in reading of a character document, in a case where the character portion is in jet black and the paper color portion is in sparkling white, a clearer difference between the character color and the paper color results in more brilliant image data or printed material produced based on the image data. The image reading device 1 of this embodiment, in the character mode, does not use a sparkling white, white reference, a jet black, black reference, etc. but uses a darker white reference and a brighter black reference. That is, a density range between the white reference and the black reference is intentionally narrowed down. As a result, the character portion is easily read in jet black. On the other hand, the paper portion is easily read in sparkling white. Therefore, without performing image processing such as Y conversion or the like, the brilliant image data of the character document can be provided at a stage when outputted from the shading correction part 8.

(Photo Mode)

Figure 7:
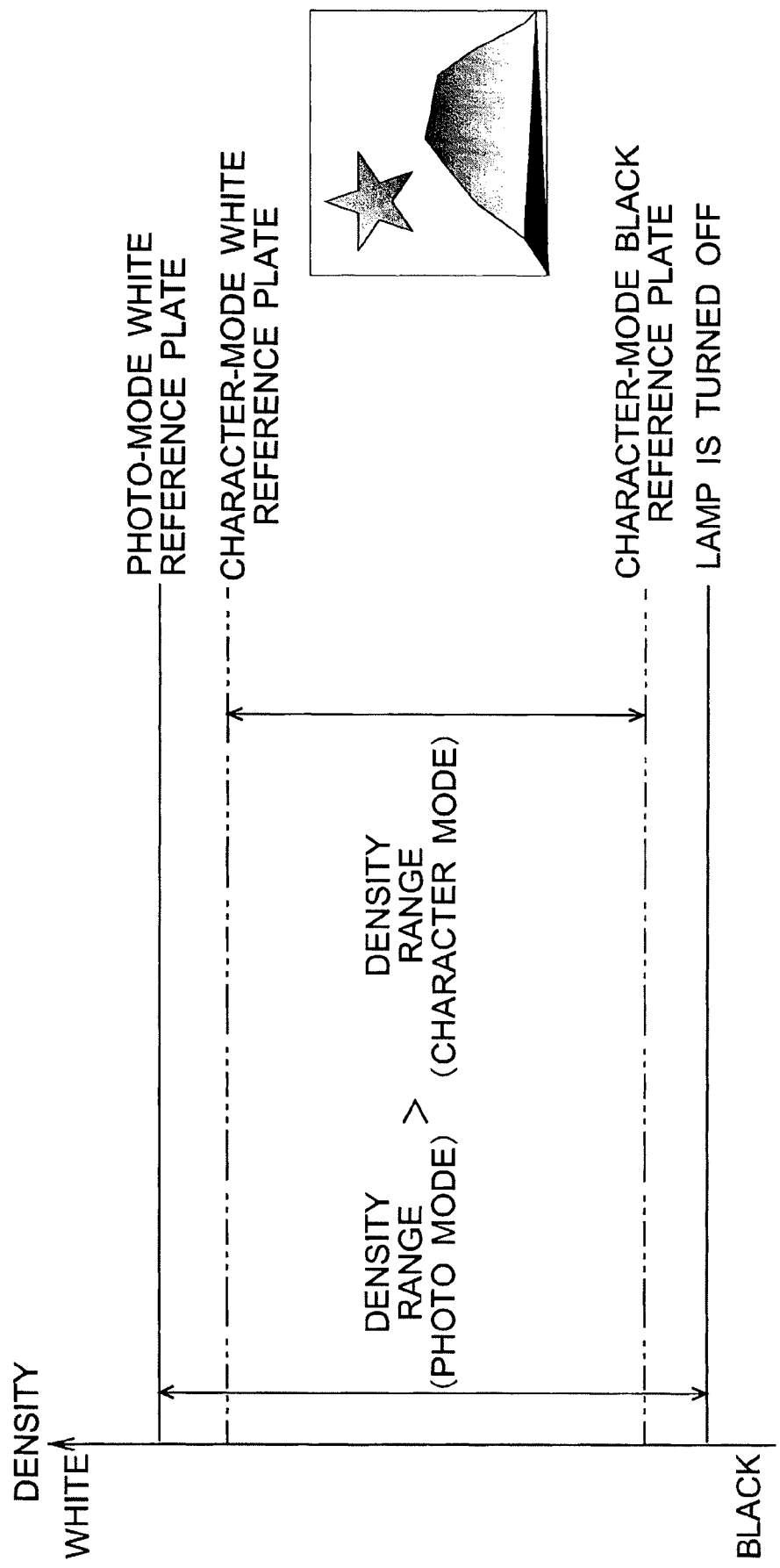
FIG. 7 is an explanatory diagram of one example of shading correction in a photo mode according to the first embodiment.

Next, based on FIG. 7, the shading correction in the photo mode according to the first embodiment of the present invention will be described. FIG. 7 is an explanatory diagram of one example of the shading correction in the photo mode according to the first embodiment of the present invention. A vertical axis in a graph of FIG. 7 denotes density, which becomes increasingly whiter (brighter) upward and becomes increasingly blacker (darker) downward. Moreover, the present invention will be described, referring to as an example reading of an image having an achromatic gray scale.

As described above, the shading correction part 8 of the image reading device 1 of the this embodiment, when something whiter than the white reference has been read, expresses it in sparkling white on the image data (for example, with a density value of "255" in the gray scale). On the other hand, the shading correction part 8, when something blacker than the black reference has read, expresses it in jet black on the image data (for example, with a density value of "0" in the gray scale).

Thus, for example, as shown on the right of FIG. 7, in reading a non-binary pattern or photo with color gradation, if a density range in reading is narrow, accurate reading is not performed and some color may be replaced with a different color (may fade). Thus, in the photo mode, the density range in reading is set larger than that in the character mode. Specifically, the shading correction part 8 defines the white reference based on the output digital data of the image sensor 24 when the photo-mode white reference plate WP brighter than the character-mode white reference plate WT has been read. Moreover, the shading correction part 8 defines the black reference based on the output digital data of the image sensor 24 when the lamp 25 has been turned off.

For example, the photo-mode white reference plate WP is provided as a whitest possible white reference. On the other hand, the output of the image sensor 24 when the lamp 25 has been turned off is a dark current, and the output of the image sensor 24 should be usually smallest. In this manner, in the photo mode, color reading is made possible in a wide range with the density range serving as a maximum limit. Therefore, the image data outputted from the shading correction part 8 provides rich color expression.

(Reading Control)

Figure 8:
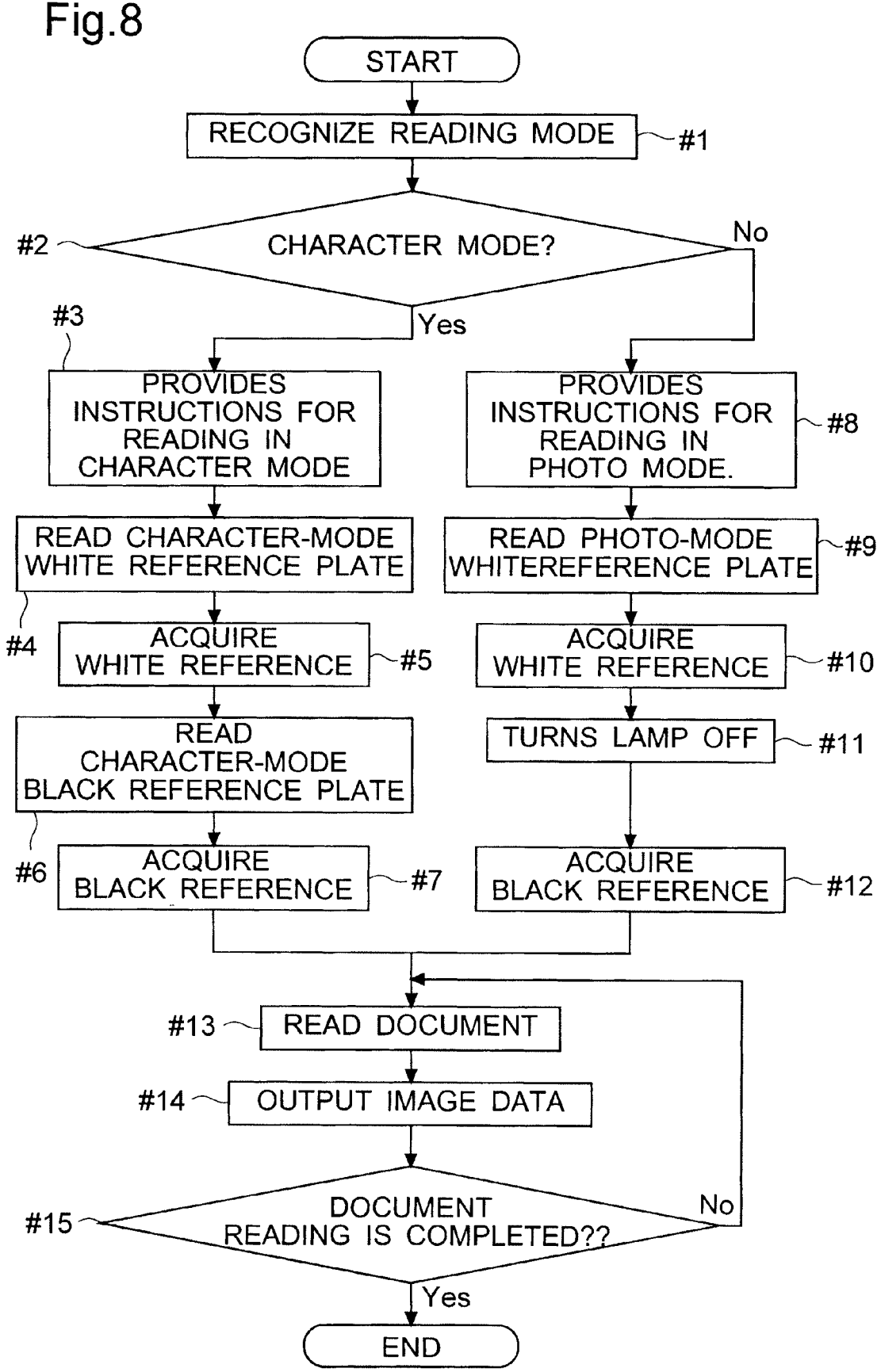
FIG. 8 is a flowchart showing one example of document reading control in the copier according to the first embodiment.

Next, based on FIG. 8, one example of document reading control in the copier 100 according to the first embodiment of the present invention will be described. FIG. 8 is a flow chart showing one example of the document reading control in the copier 100 according to the first embodiment of the present invention. This description is provided referring to an example where either of the character mode and the photo mode is set on the operation panel 7 at the time of document reading such as scanning, copying, or the like.

Note that there is a case where, at the time of document reading such as copying or the like, the user presses down the start key 71 without making the selection between the character mode and the photo mode to provide instructions for starting job execution. In this case, it may be treated as reading in the character mode or the photo mode without exception.

First, starting is, for example, at a point in time when the start key 71 of the operation panel 7 has been pressed down to provide instructions for starting the document reading such as copying, scanning, or the like. At this point, the control part 10 recognizes the mode selected in the reading (step #1). Next, the control part 10 checks whether or not the selected mode is the character mode (step #2).

If the selected mode is the character mode (Yes in step #2), the control part 10 provides the reading control part 20 with instructions for reading in the character mode (step #3). The reading control part 20 which has received the instructions, in order to acquire the white reference in the character mode, drives the wind-up motor 27M to move the moving frames to cause reading of the character-mode white reference plate WT in the shading plate 29*a* (step #4). Then the shading correction part 8 which has received the digital data based on the output of the image sensor 24 acquires the white reference in the character mode for each pixel (step #5).

Further, the reading control part 20, in order to acquire the black reference in the character mode, drives the wind-up motor 27M to move the moving frames to cause reading of the character-mode black reference plate BT in the shading plate 29*a* (step #6). The shading correction part 8 which has received the digital data based on the output of the image sensor 24 acquires the black reference in the character mode for each pixel (step #7). In this manner, in the image reading device 1 of this embodiment, when the character mode has been selected, the shading correction part 8 defines the white reference based on the output of the image sensor 24 when the character-mode white reference plate WT darker than the photo-mode white reference plate WP has been read, and defines the black reference based on the output of the image sensor 24 when the character-mode black reference plate BT has been read.

On the other hand, if the selected mode is not the character mode (No in step #2), the selected mode is the photo mode in this description, and thus the control part 10 provides the reading control part 20 with instructions for reading in the photo mode (step #8). The reading control part 20 which has received the instructions, in order to acquire the white reference in the photo mode, drives the wind-up motor 27M or otherwise to cause reading of the photo-mode white reference plate WP in the shading plate 29*a* (step #9). The shading correction part 8 which has received the digital data based on the output of the image sensor 24 acquires the white reference in the photo mode for each pixel (step #10).

Further, the reading control part 20, in order to acquire the black reference in the photo mode, turns the lamp 25 off (step #11). The shading correction part 8 which has received the digital data based on the output of the image sensor 24 when the lamp 25 has been turned off acquires the black reference in the photo mode for each pixel (step #12). In this manner, in the image reading device 1 of this embodiment, when the photo mode has been selected, the shading correction part 8 defines the white reference based on the output of the image sensor 24 when the photo-mode white reference plate WP brighter than the character-mode white reference plate WT has been read, and defines the black reference based on the output of the image sensor 24 when the light source has been turned off.

Then after steps up to step #7 or step #12 have been executed to acquire the white reference or the black reference, actual document reading is performed (step #13). The shading correction part 8, for each pixel, performs quantization with the predefined number of gradations (for example, an achromatic 256 gray scale or 256 gradations for R, G, and B, respectively) while standardizing the output value (digital data) of the image sensor 24 between the white reference and the black reference and outputs the image data of the document (step #14). Then until the document reading is fully completed (step #15), the document reading and outputting the image data from the shading correction part 8 are repeated (No in step #15→step #13). When the document reading has been completed, the reading control ends, and for example, printing based on the image data is performed or the image data is stored into the storage part 10*b*.

As described above, the image reading device 1 of this embodiment includes: the lamp 25 (light source) that irradiates a reading target (for example, a document) with light; the image sensor 24 which receives the incoming reflection light from the reading target and reads the reading target (for example, the document); a plurality of kinds of white reference plates (for example, the character-mode white reference plate WT and the photo-mode white reference plate WP) of mutually different brightness levels provided for the purpose of acquiring the white reference in the shading correction; the operation panel 7 (input part) that accepts, as the mode for the document reading, the input of the selection between the character mode that prioritizes character reproduction and the photo mode that prioritizes figure and photo reproduction; and the shading correction part 8 that, when the character mode has been selected, performs the shading correction by defining the white reference based on the output of the image sensor 24 when the character-mode white reference plate WT darker than the photo-mode white reference plate WP has been read.

Consequently, in the character mode, the white reference is defined by reading the white reference plate (character-mode white reference plate WT) darker than the photo-mode white reference plate WP. Thus, a portion whiter (brighter) than the character-mode white reference plate WT is read in sparkling white. That is, in the character mode, the density range (overall density region) in the document reading is intentionally narrowed down. Therefore, a background portion and a blank space of the paper are easily read in sparkling white.

Moreover, the image reading device 1 includes one black reference plate (character-mode black reference plate BT) provided for acquiring the black reference in the shading correction. When the character mode has been selected, the shading correction part 8 defines the black reference based on the output of the image sensor 24 when the black reference plate (character-mode black reference plate BT) has been read. Consequently, in the character mode, the black reference is defined by reading the black reference plate (character-mode black reference plate BT) that permits acquisition of the black reference brighter than that when the lamp 25 is not on. Thus, a portion blacker (darker) than the character-mode black reference plate BT is read in jet black. That is, in the character mode, the density range (overall density region) in the document reading is intentionally narrowed down. Therefore, in the character mode, a character portion of the document is easily read in jet black.

Consequently, in the character mode, a difference between black of the character portion and white of the background portion, etc. becomes clear. Moreover, there is no need of performing Y conversion processing and/or spatial filter processing to provide a clear black-white difference, thus causing no image quality deterioration as a result of the Y conversion processing and/or the spatial filter processing. Moreover, since there is no need of performing the Y conversion processing and/or the spatial filter processing, density-gradation relationship between the white reference and the black reference is maintained. Therefore, the image data obtained by the document reading consequently have high image quality.

Moreover, when the photo mode has been selected, the shading correction part 8 defines the white reference based on the output of the image sensor 24 when the photo-mode white reference plate WP brighter than the character-mode white reference plate WT has been read. Moreover, when the photo mode has been selected, the shading correction part 8 defines the black reference based on the output of the image sensor 24 when the lamp 25 (light source) has been turned off.

In the photo mode, the white reference is defined by reading the white reference plate brighter than the character-mode white reference plate WT, and the black reference is defined by turning off the lamp 25 that becomes darker than the character-mode black reference plate BT. That is, in the photo mode, the density range (overall density region) in the document reading becomes wider than that in the character mode. Thus, in the document reading, colors existing in the document in a wide range from bright colors to dark colors can be read, thereby widening a color range. Therefore, a color reproduction range widens, and the image data obtained by the document reading consequently have high image quality.

Moreover, for printing with the copier 100, in the character mode, printing can be performed based on the image data of high image quality with a clear black-white difference without any image quality deterioration. Moreover, in the photo mode, printing can be performed based on the image data of high image quality with a wide color reproduction range. Therefore, in either the character mode or the photo mode, the image quality of a printed matter improves.

(Second Embodiment)

Figure 9:
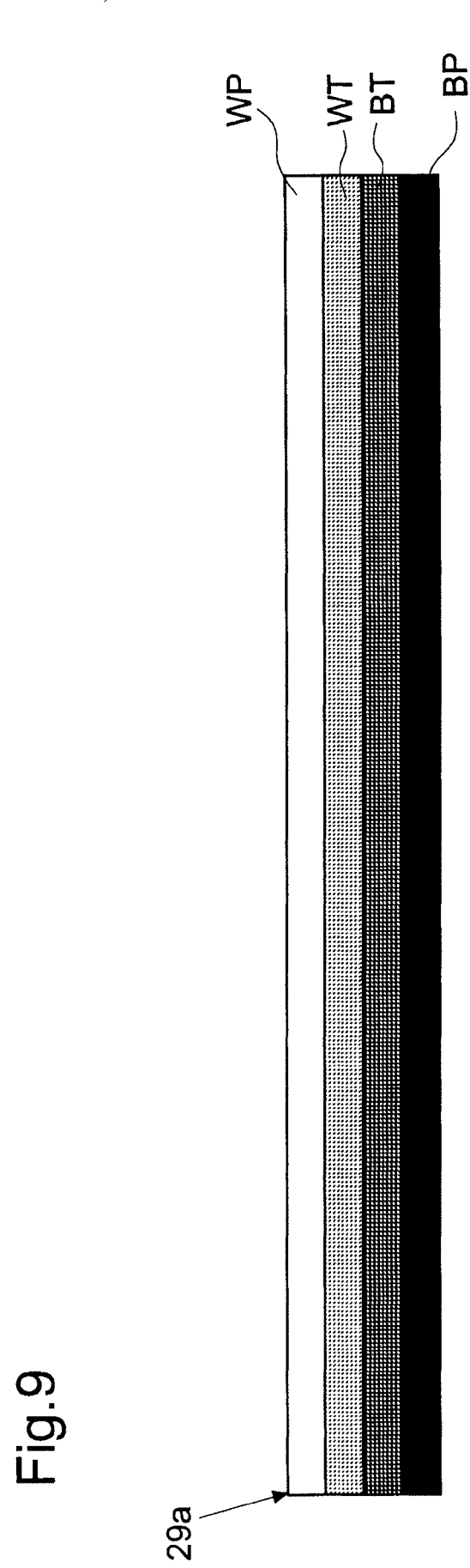
FIG. 9 is a plan view showing one example of a shading plate according to a second embodiment.
Figure 10:
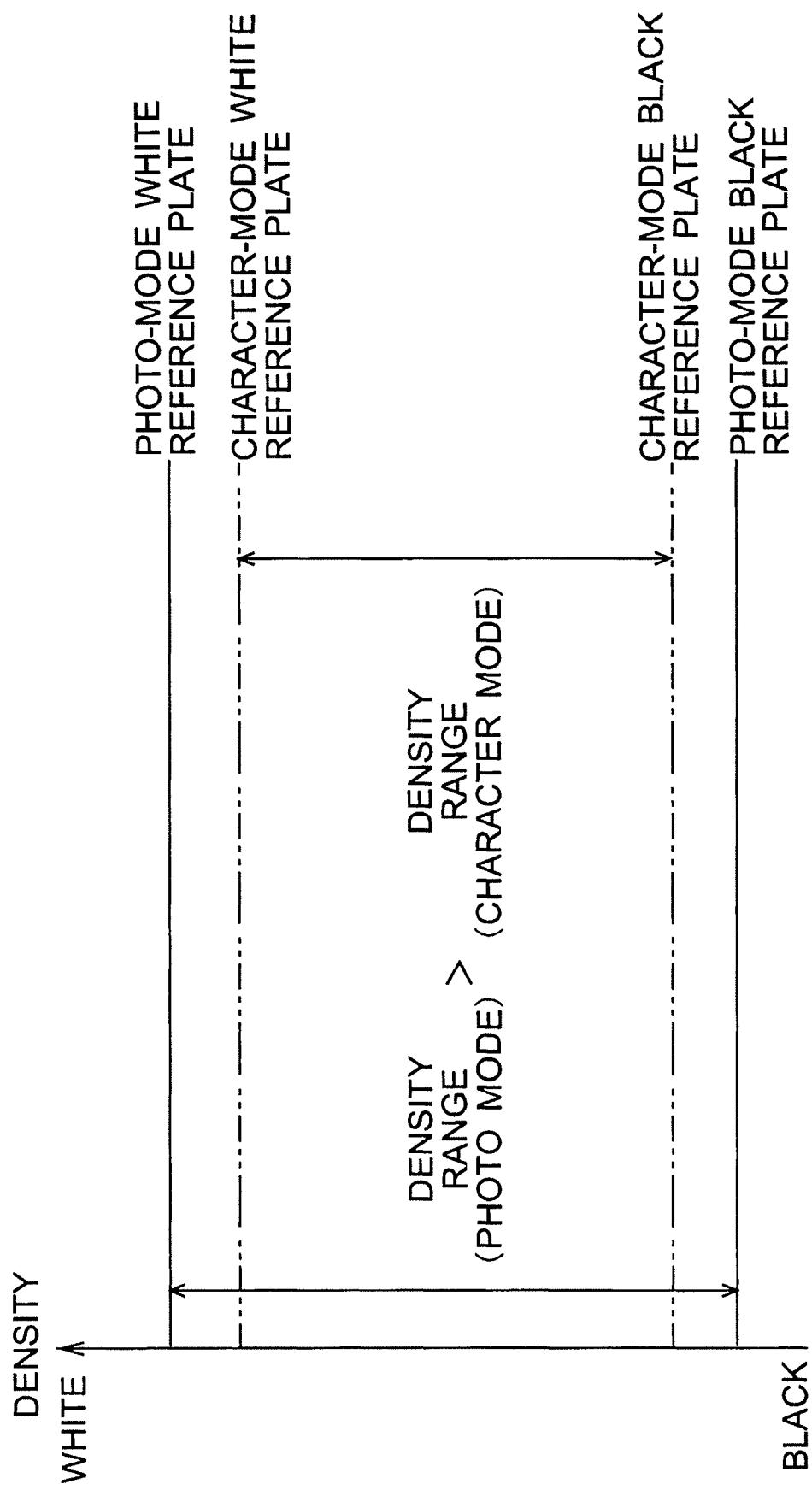
FIG. 10 is an explanatory diagram of one example of white references and a black reference in shading correction in each of modes according to the second embodiment.
Figure 11:
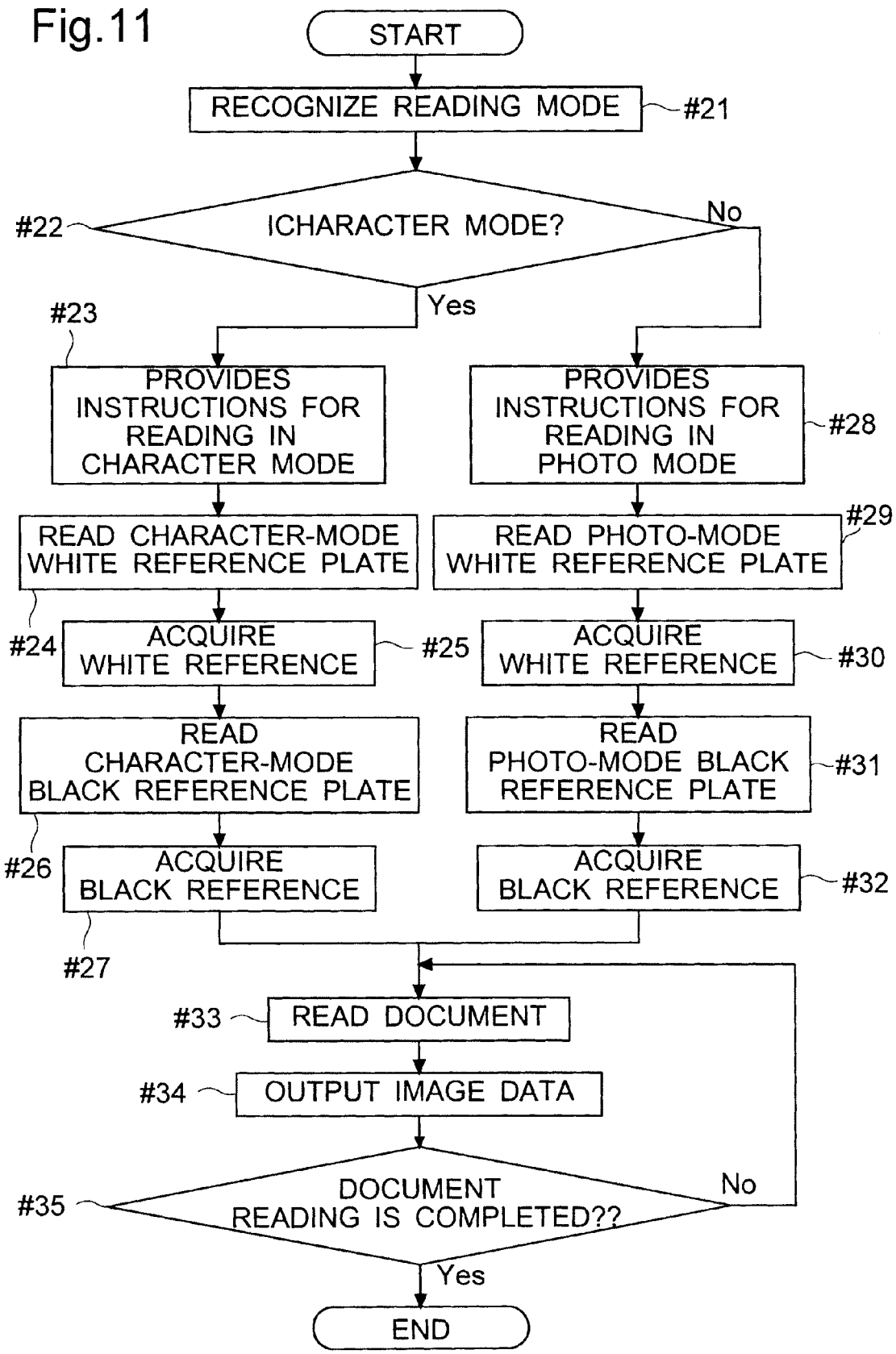
FIG. 11 is a flowchart showing one example of document reading control in a copier according to the second embodiment.

Next, based on FIGS. 9 to 11, the second embodiment of the present invention will be described. FIG. 9 is a plan view showing one example of a shading plate 29a according to the second embodiment of the present invention. FIG. 10 is an explanatory diagram of one example of a white reference and a black reference in shading correction in different modes according to the second embodiment of the present invention. FIG. 11 is a flowchart showing one example of document reading control with a copier 100 according to the second embodiment of the present invention.

Here, the second embodiment differs from the first embodiment in a point that the black reference in the shading correction is acquired by using a photo-mode black reference plate BP at the time of document reading in the photo mode (the black reference is acquired by turning the lamp 25 off at the time of document reading in the photo mode in the first embodiment). However, the second embodiment is equal to the first embodiment in other points including configuration of an image reading device 1, the copier 100, etc. Thus, in the following description, to common portions, the description in the first embodiment is applicable and thus their description will be omitted unless they are specifically described with illustration, and different points will be described.

First, one example of the shading plate 29a in this embodiment is shown in FIG. 9. Note that configuration of the image reading device 1, installation position of the shading plate 29a, etc. may be equal to those of the first embodiment. In the second embodiment, viewing from the top of FIG. 9, a plurality of reference plates including a photo-mode white reference plate WP, a character-mode white reference plate WT, a character-mode black reference plate BT, and a photo-mode black reference plate BP are combined together to form the shading plate 29a. That is, provided in the image reading device 1 of this embodiment are: a plurality of kinds of white reference plates of mutually different brightness levels; and a plurality of kinds of black reference plates of mutually different brightness levels.

Next, based on FIG. 10, density relationship between the reference plates will be described. A vertical axis in a graph of FIG. 10 denotes density, which becomes increasingly whiter (brighter) upward and increasingly becomes blacker (darker) downward.

A shading correction part 8, when something whiter than the white reference has been read, expresses it in sparkling white on image data (for example, with a density value of "255" in a gray scale). On the other hand, the shading correction part 8, when something blacker than the black reference has been read, expresses it in jet black (lower limit) on the image data (for example, with a density value of "0" in the gray scale).

The image reading device 1 of this embodiment, in the character mode, acquires the white reference and the black reference by using the darker white reference plate (for example, in bright gray and for example, darker than a paper color) and a brighter black reference plate (for example, in dark gray and for example, brighter than a character printed with largest density). A density range of the white reference and the black reference is intentionally narrowed down more than that in the character mode. Moreover, the character-mode black reference plate BT is brighter than the photo-mode black reference plate BP. As a result, a character portion is easily read in jet black, and a paper portion is easily read in sparkling white.

On the other hand, in reading of a figure or a photo with color gradation, a narrow density range in reading makes it difficult to achieve accurate reading. Thus, in the photo mode, the density range in reading is made larger than that in the character mode. Specifically, the photo-mode white reference plate WP is whiter (brighter) than the character-mode white reference plate WT. Moreover, the photo-mode black reference plate BP is blacker (darker) than the character-mode black reference plate BT. FIG. 10 illustrates black and white relationship between these density levels. As is the case with the first embodiment, the density range (entire density region, color range) in the character mode is wider than the density range in the character mode.

Based on FIG. 11, one example of document reading control with the copier 100 according to the second embodiment of the present invention will be described. Also this description, as is the case with the first embodiment, refers to a case where at the time of document reading such as copying, either the character mode or the photo mode is set on the operation panel 7.

Here, in FIG. 11, steps #21 to #30 and steps #32 to #35 are equivalent to steps 1 to #10 and steps #12 to #15 in FIG. 8. Thus, a description of steps #21 to #30 and steps #32 to #35 will be omitted since the description of steps #1 to #10 and steps #12 to #15 in FIG. 8 will be applied thereto.

An actual difference between the first embodiment and the second embodiment lies only in a step #31 portion. In the first embodiment, in the photo mode, the shading correction part 8 defines the black reference based on the digital data as the output of the image sensor 24 when the lamp 25 has been turned off (step #11 in FIG. 8). On the contrary, in the second embodiment, the shading correction part 8 defines the black reference based on the digital data as the output of the image sensor 24 when the photo-mode black reference plate BP has been read.

Specifically, when the character mode has been selected, the shading correction part 8 defines the white reference based on the output of the image sensor 24 when the character-mode white reference plate WT darker than the photo-mode white reference plate WP has been read. Moreover, when the character mode has been selected, the shading correction part 8 defines the black reference based on the output of the image sensor 24 when the character-mode black reference plate BT brighter than the photo-mode black reference plate BP has been read.

Moreover, when the photo mode has been selected, the shading correction part 8 defines the white reference based on the output of the image sensor 24 when the photo-mode white reference plate WP brighter than the character-mode white reference plate WT has been read, and defines the black reference based on the output of the image sensor 24 when the photo-mode black reference plate BP darker than the character-mode black reference plate BT has been read.

In this manner, the image reading device 1 of this embodiment includes a plurality of kinds of black reference plates (character-mode black reference plate BT and photo-mode black reference plate BP) of mutually different brightness levels, and when the character mode has been selected, the shading correction part 8 defines the black reference based on the output of the image sensor 24 when the character-mode black reference plate BT brighter than the photo-mode black reference plate BP has been read.

Therefore, with the image reading device 1 of this embodiment, in the character mode, the white reference is defined by reading the character-mode white reference plate WT darker than the photo-mode white reference plate WP. Moreover, the black reference is defined by reading the character-mode black reference plate BT brighter than the photo-mode black reference plate BP. That is, as is the case with the first embodiment, in the character mode, the density range (entire density region) in document reading is intentionally narrowed down. Thus, a portion whiter (brighter) than the character-mode white reference plate WT is read in sparkling white. Moreover, a portion blacker (darker) than the black reference plates is read in jet black. That is, in the character mode, a character portion of the document is easily read in jet black, and a background portion and a blank space of the paper are easily read in sparkling white.

Thus, also in this embodiment, in the character mode, a difference between black of the character portion and white of the background portion, etc. becomes clear. Moreover, to provide a clear black-white difference, there is no need of performing the Y conversion processing and/or the spatial filter processing, thus causing no image quality deterioration attributable to the Y conversion processing and/or the spatial filter processing. Moreover, since there is no need of performing the Y conversion processing and/or the spatial filter processing, density-gradation relationship between the white reference and the black reference is maintained. Therefore, the image data obtained by the document reading consequently have high image quality.

Moreover, when the photo mode has been selected, the shading correction part 8 defines the white reference based on the output of the image sensor 24 when the photo-mode white reference plate WP brighter than the character-mode white reference plate WT has been read. Moreover, when the photo mode has been selected, the shading correction part 8 defines the black reference based on the output of the image sensor 24 when the photo-mode black reference plate BP darker than the character-mode black reference plate BT has been read.

Thus, in the character mode, the density range (entire density region) in the document reading becomes wider than that in the character mode. Thus, in the document reading, colors exiting in the document in a wide range from bright colors to dark colors can be read, thus resulting in a wide color range. Therefore, a color reproduction range widens, and image data obtained by the document reading consequently have high image quality.

Based on the first and second embodiments, the present invention has been described above. As described referring to FIGS. 8 and 11, the present invention includes several steps. Thus, the present invention can be considered as an invention of a shading correction method.

Moreover, the first and second embodiments have been described, referring to examples where the white reference and the black reference differ between the character mode and the photo mode. However, for example, while the white reference differs between the character mode and the photo mode as described above, the shading correction part 8 may define, in both the character mode and the photo mode, the black reference based on the output of the image sensor 24 when the light source (lamp 25) has been turned off. Alternatively, the shading correction part 8 may define, in both the character mode and the photo mode, the black reference based on the output of the image sensor 24 when the same black reference plate has been read.

In this manner, providing the same black reference while providing different white references between the character mode and the photo mode can provide effect of providing different density ranges (color ranges) between the character mode and the photo mode.

What is claimed are:

1. An image reading device comprising:
a light source irradiating a reading target with light;
an image sensor receiving incoming reflection light from the reading target and reading the reading target;
a plurality of kinds of white reference plates of mutually different brightness levels provided for acquiring a white reference in shading correction;
an input part accepting input of selection, as a mode for document reading, between a character mode prioritizing character reproduction and a photo mode prioritizing figure and photo reproduction; and
a shading correction part, when the character mode has been selected, perform the shading correction by defining the white reference based on output of the image sensor when the character-mode white reference plate darker than the photo-mode white reference plate has been read.

2. The image reading device according to claim 1, including one black reference plate provided for acquiring a black reference in the shading correction,
wherein the shading correction part, when the character mode has been selected, defines the black reference based on output of the image sensor when the black reference plate has been read.

3. The image reading device according to claim 1
wherein the shading correction part, when the photo mode has been selected, defines the white reference based on output of the image sensor when the photo-mode white reference plate brighter than the character-mode white reference plate has been read.

4. The image reading device according to claim 3,
wherein when the photo mode has been selected, the shading correction part defines the black reference based on output of the image sensor when the light source has been turned off.

5. The image reading device according to claim 1, including a plurality of kinds of black reference plates of mutually different brightness levels,
wherein when the character mode has been selected, the shading correction part defines the black reference based on output of the image sensor when the character-mode black reference plate brighter than the photo-mode black reference plate has been read.

6. The image reading device according to claim 5,
wherein when the photo mode has been selected, the shading correction part defines the white reference based on output of the image sensor when the photo-mode white reference plate brighter than the character-mode white reference plate has been read.

7. The image reading device according to claim 5,
wherein when the photo mode has been selected, the shading correction part defines the black reference based on output of the image sensor when the photo-mode black reference plate darker than the character-mode black reference plate has been read.

8. An image reading device shading correction method comprising the steps of:
irradiating a reading target with light by a light source;
receiving incoming reflection light from the reading target and reading the reading target by an image sensor;
accepting input of selection, as a mode for document reading, between a character mode prioritizing character reproduction and a photo mode prioritizing figure and photo reproduction by an input part; and
performing, when the character mode has been selected, shading correction by a shading correction part, by defining a white reference based on output of the image sensor when of a plurality of kinds of white reference plates of mutually different brightness levels provided for acquiring the white reference in the shading correction, the character-mode white reference plate darker than the photo-mode white reference plate has been read.

9. The image reading device shading correction method according to claim 8, including a step wherein, when the character mode has been selected, the shading correction part defines a black reference based on output of the image sensor when one black reference plate provided for acquiring the black reference in the shading correction has been read.

10. The image reading device shading correction method according to claim 8, including a step wherein, when the photo mode has been selected, the shading correction part defines the white reference based on output of the image sensor when the photo-mode white reference plate brighter than the character-mode white reference plate has been read.

11. The image reading device shading correction method according to claim 10, including a step wherein, when the photo mode has been selected, the shading correction part defines a black reference based on output of the image sensor when the light source has been turned off.

12. The image reading device shading correction method according to claim 8, including a step wherein, when the character mode has been selected, the shading correction part defines a black reference based on output of the image sensor when of a plurality of kinds of black reference plates of mutually different brightness levels provided for acquiring the black reference in the shading correction, the character-mode black reference plate brighter than the photo-mode black reference plate has been read.

13. The image reading device shading correction method according to claim 12, including a step wherein, when the photo mode has been selected, the shading correction part defines the white reference based on output of the image sensor when the photo-mode white reference plate brighter than the character-mode white reference plate has been read.

14. The image reading device shading correction method according to claim 12, including a step wherein, when the photo mode has been selected, the shading correction part defines the black reference based on output of the image sensor when the photo-mode black reference plate darker than the character-mode black reference plate has been read.

15. An image forming apparatus including the image reading device according to claim 1.

* * * * *